INVENTOR.
GLENNIS R. PUCKETT

BY *Polachek & Saulsbury*

ATTORNEYS

United States Patent Office 3,605,341
Patented Sept. 20, 1971

3,605,341
PORTABLE SLIDING WINDOWS FOR
AUTOMOBILES
Glennis R. Puckett, Rte. 2, Box 850,
Somerville, Ala. 35670
Filed July 24, 1969, Ser. No. 844,547
Int. Cl. E05b 13/00; E06b 3/46
U.S. Cl. 49—413      4 Claims

ABSTRACT OF THE DISCLOSURE

A portable sliding window device for automobiles formed of sliding window parts and top and bottom channel groove pieces serving to lock the device into the automobile door window opening and wherein the locking is effected by a simple U-shaped locking member adapted to be snapped into the channel grooves and its bight portions being locked into the groove of the window opening support at the rear edge of the door opening. The inner sliding door is slidable in the channel grooves and can be slid by the use of a knob on one of the wiindow pieces between open and closed positions.

---

This invention relates to portable sliding windows for automobiles.

It is an object of the present invention to provide a portable sliding window which can be inserted in the door window opening of automobiles and fastened therein without the need of fastening screws or the like, and wherein the vertical edge of the fixed window and the U-shaped rod will serve to retain the sliding window device within the window channels of the door.

It is another object of the invention to provide a sliding window for automobile door openings wherein but two pieces of straight double channel members, one at the top and the other at the bottom in which the fixed window part and the sliding door are mounted and the fixed window held in place in the front groove of the automobile door by a one quarter inch rod bent to the shape of one of the window parts and adapted to have its vertically-extending bight portion extended into the vertically extending groove at the rear end of the door opening.

It is another object of the invention to provide an easy removable plastic glass sliding door window device in which the parts of the windows themselves serve to secure the sliding door window within the automobile door opening and which will be more durable than electric power windows and will withstand movement of several hundred times a day as when used by mail carriers and delivery personnel without being put out of use or applying extended wear on power-operated parts.

Other objects of the invention are to provide a portable sliding window device for automobile window openings having the above objects in mind, which is simple in construction an inexpensive to manufacture, has a minimum number parts, convenient manner, attractive and of pleasing appearance, can be conveniently locked into the window by its own parts and can be easily and readily removed, self-draining from rain, will be air and water tight, light in weight, non-breakable, effective and efficient in use.

For a better understanding of the invention, reference may be had to the following detailed description taken in connection with the accompanying drawing, in which FIG. 1 is a perspective view of the automobile and the sliding door window of the present invention mounted in the right front door window opening.

Figure 1:
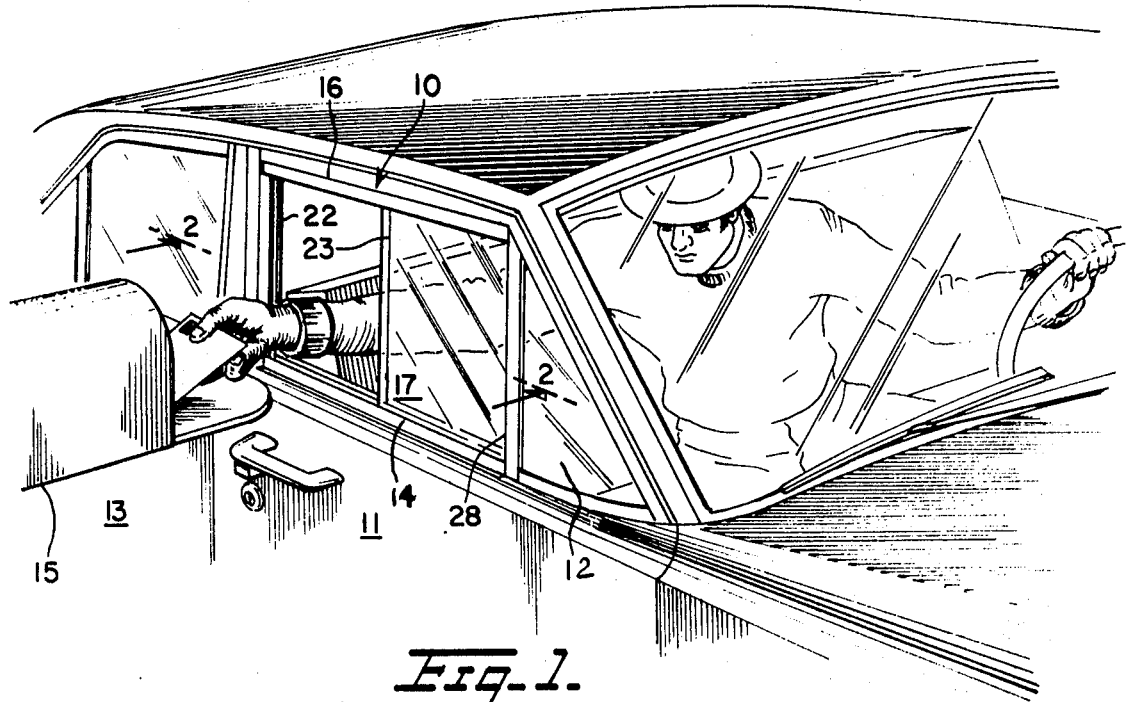
Figure 2:
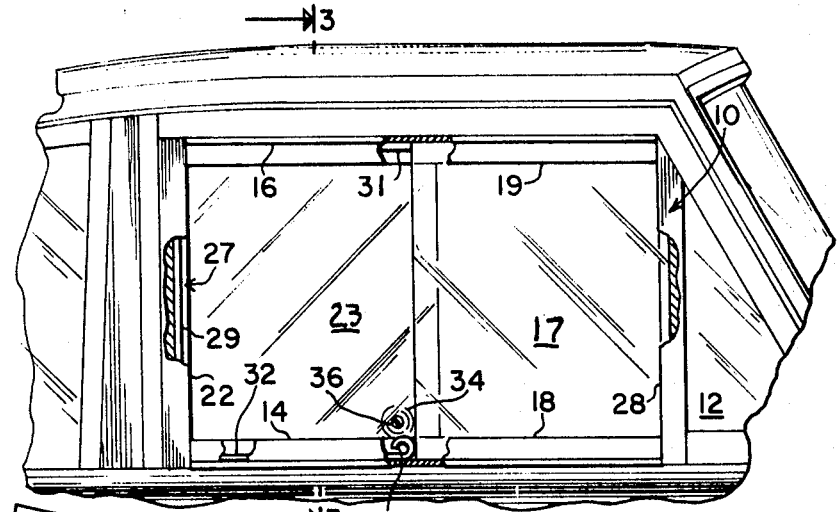
FIG. 2 is an enlarged vertical elevational view of the sliding window device as viewed in the direction of arrows 2—2 of FIG. 1.
Figure 3:
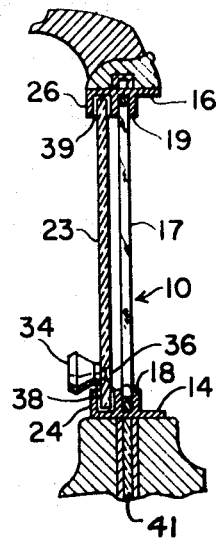
FIG. 3 is an enlarged fragmentary vertical elevational view of the automobile door and sliding window with portions of the window broken away to show the internal bent rod window retaining member.
Figure 4:
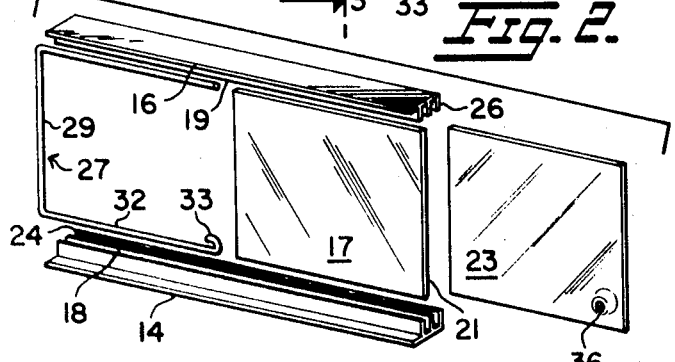
FIG. 4 is a perspective and collective view of the sliding door window parts disassembled from the door window and from one another.

Referring now to the figures, 10 represents generally the sliding window device of the present invention as adapted to be installed in a front door 11 of an automobile rearwardly of the regular ventilating window 12. In the showing of FIG. 1, the sliding window device 10 is shown mounted in the right front door window opening of the automobile as it will be seen and can be readily mounted in the left door window adjacent to the driver's seat or in one of the rear door window openings, one such rear door being shown at 13.

The glass windows normally provided in the automobile doors will be lowered either by an electric motor or by hand in the usual manner providing the window opening into which the sliding window device will be inserted and to locate the window glass into the bottom of the door in the usual manner.

With this effected, a bottom double channel piece 14 is laid over the retracted glass to close the opening therein. Fitted into the top of the window opening is a similar double channel piece 16 and upon mounting the same therein a plastic window 17 is placed into the outer grooves 18 and 19 of the respective channels 14 and 16 so as to support the channels in place within the window opening against vertical displacement and at the same time to locate front edge 21 of plastic window panel 17 in a vertical groove at the front vertical edge 28 of the door opening.

At the same time that the plastic sliding window 17 is placed within the double channel pieces 14 and 16, the sliding window door 23 of plastic is placed in the respective inner grooves 24 and 26 of the channel pieces 14 and 16.

To lock the entire assembly in place within the door opening, a one quarter inch diameter rod locking device 27 is provided in the rear channels 24 and 26 and is retained in and along the vertical window edge 22 of the automobile door 11. This rod 27 is bent to a U-shaped form to provide a bight portion 29, a top leg portion 31, a bottom leg portion 32 with a loop end 33 which will engage and abut along with the upper leg 31 the rear edge of the window 17 to lock the same in the rear groove of the channel piece against lateral displacement and at the same time place the bight portion 29 tight inside the vertical groove in the rear window edge 28 whereby the entire device is locked squarely in place within the window opening.

The sliding plastic window 23 has a hand knob 34 held on the window slide 23 by a bolt 36 and is accessible from inside the automobile to slide the window 23 as desired particularly by mail or delivery men who would find this sliding window device most desirable and effective. The rear channel grooves 24 and 26 may be provided with felt to ease the sliding movement of the sliding door 23 and at the same time provide for an airtight closure over and under the bottom and top edges of the sliding door 23. The regular window glass in the door which will have been lowered and which is shown at 41 can be raised within the door 11 and brought tightly up against the underside of the channel 14 to further assist in holding the sliding door window device in place.

When it is desired to remove the sliding window device to frame the door 11, which can be done easily and quickly, a tool can be extended under the loop end 33 of the lower leg 32 of the U-shaped locking rod 27 and lift rod from the channel grooves 18 and 19. This allows the channel pieces along with the plastic windows 14 and 16 to be removed free of the door window opening. Thus the parts of this sliding window device can be readily disassembled from the door window opening and the regular window glass 41 reestablished as the enclsoure therefor.

It should now be apparent that there has been provided as sliding door window device which can easily be installed in a window of an automobile and easily removed. The channel pieces can be painted or coated with plastic or rubber to keep them from marring the paint on the automobile. However, it can be seen that the installation is so rigid that any sliding movement of the parts would not mar the paint. The U-shaped one quarter inch rod can likewise be plastic or rubber covered metal for appearance without effecting the spring action or tension to keep it from remaining tight in the channels and to help the device in the window opening.

It can be readily seen that utilization is made of two vertical sides of the window opening to lock the window sliding device in place. While that sliding window device has been described for connection into an automobile door opening it shall be understood that this same device of the same number of parts and in the same manner can be put together into place in another window and door openings on other types of vehicles or building structures.

What is claimed is:

1. A portable sliding window device for automobile doors comprising double channel pieces adapted to fit the top and bottom of an automobile door window opening, running co-extensively therewith and to the full extent therealong, a first window panel disposed in one groove of the channel pieces and adapted to have its rear edge locked in a vertical groove of the door opening, a sliding door disposed in the other channel grooves of the channel pieces and slidable between open and closed positions adapted for engagement with groove in the rear vertical edge of the door opening, a rod bent into U-shape and having top and bottom leg portions lying in the channel grooves and its bight portion forceably retained against in the rear vertical groove of the door window opening, the free ends of the legs of the bent rod retained in abutting relationship with the first window panel and of such length as to retain the forward edge of the first window in the vertical groove at the front of the automobile window opening.

2. A portable sliding window device for automobile doors as defined in claim 1, and the lower leg having its free end formed into a loop for engaging the rear edge of the first window panel and adapted to receive a tool for lifting this rod retaining means out of the channel groove of the channel piece.

3. A portable sliding window device for automobile doors as defined in claim 2, and said slidable window having an inwardly extending knob at its forward edge fixed thereto and readily accessible to slide forwardly the sliding door window.

4. A portable sliding window device for automobile doors as defined in claim 3, and felt lining material disposed in the sliding door groove for easing the sliding movement of the sliding door therein.

References Cited

UNITED STATES PATENTS

| | | | |
|---|---|---|---|
| 1,691,559 | 11/1928 | Wishmeier | 49—48 |
| 1,808,263 | 6/1931 | Sheerar | 49—48 |
| 2,913,046 | 11/1959 | Sharp et al. | 49—425X |

FOREIGN PATENTS

| | | | |
|---|---|---|---|
| 486,113 | 9/1952 | Canada | 49—413 |

J. KARL BELL, Primary Examiner

U.S. Cl. X.R.

49—48, 449, 466